United States Patent
Lee et al.

(10) Patent No.: US 9,692,977 B2
(45) Date of Patent: Jun. 27, 2017

(54) METHOD AND APPARATUS FOR ADJUSTING CAMERA TOP-DOWN ANGLE FOR MOBILE DOCUMENT CAPTURE

(71) Applicant: Korea Advanced Institute of Science and Technology, Daejeon (KR)

(72) Inventors: Ui Chin Lee, Daejeon (KR); Jeung Min Oh, Daejeon (KR); Woo Hyuk Choi, Daejeon (KR)

(73) Assignee: Korea Advanced Institute of Science, Daejeon (KR)

( * ) Notice: Subject to any disclaimer, the term of this patent is extended or adjusted under 35 U.S.C. 154(b) by 91 days.

(21) Appl. No.: 14/719,858

(22) Filed: May 22, 2015

(65) Prior Publication Data

US 2016/0105619 A1 Apr. 14, 2016

(30) Foreign Application Priority Data

Oct. 10, 2014 (KR) .................. 10-2014-0136947

(51) Int. Cl.
*H04N 5/232* (2006.01)
*G06F 1/16* (2006.01)

(52) U.S. Cl.
CPC ....... *H04N 5/23293* (2013.01); *G06F 1/1626* (2013.01); *H04N 5/232* (2013.01); *H04N 5/23245* (2013.01); *G06F 2200/1637* (2013.01)

(58) Field of Classification Search
CPC .......... H04N 5/23293; H04N 5/23245; H04N 5/232; G06F 3/0346
See application file for complete search history.

(56) References Cited

U.S. PATENT DOCUMENTS

| | | | |
|---|---|---|---|
| 2011/0025842 A1* | 2/2011 | King | G06F 17/211 |
| | | | 348/135 |
| 2015/0116365 A1* | 4/2015 | Ding | G06F 3/0487 |
| | | | 345/659 |

* cited by examiner

*Primary Examiner* — Twyler Haskins
*Assistant Examiner* — Angel L Garces-Rivera
(74) *Attorney, Agent, or Firm* — John V. Daniluck; Bingham Greenebaum Doll LLP

(57) ABSTRACT

We offer a method of adjusting a camera top-down angle for a mobile terminal. The method involves automatically detecting whether a mobile terminal camera is set to top-down shooting mode based on the z-axis of the mobile terminal acceleration sensor, automatically adjusting a camera orientation by means of a mobile terminal gyroscope sensor when the camera is set to top-down shooting mode, and displaying the camera orientation at the mobile terminal so that a user recognizes the camera orientation and manually adjusts it when it does not correspond to the shooting orientation.

23 Claims, 13 Drawing Sheets

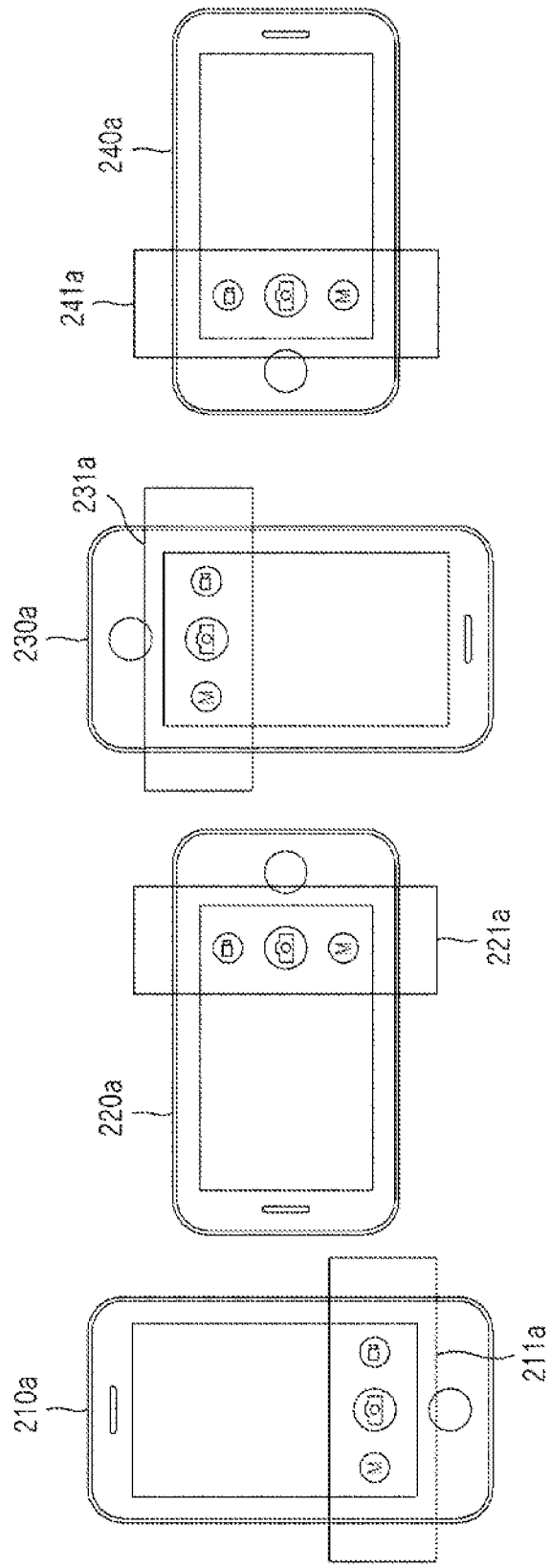

(Conventional Art)

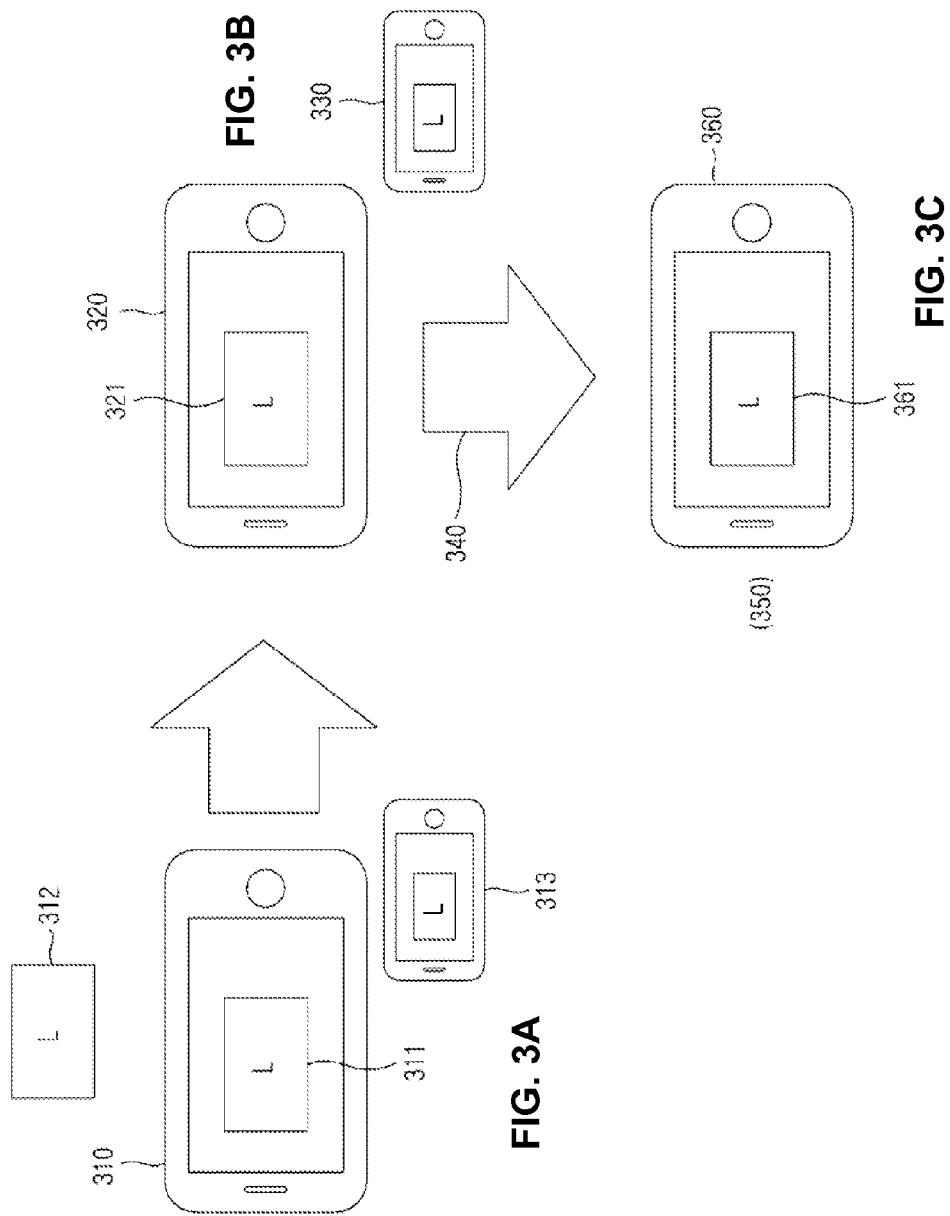

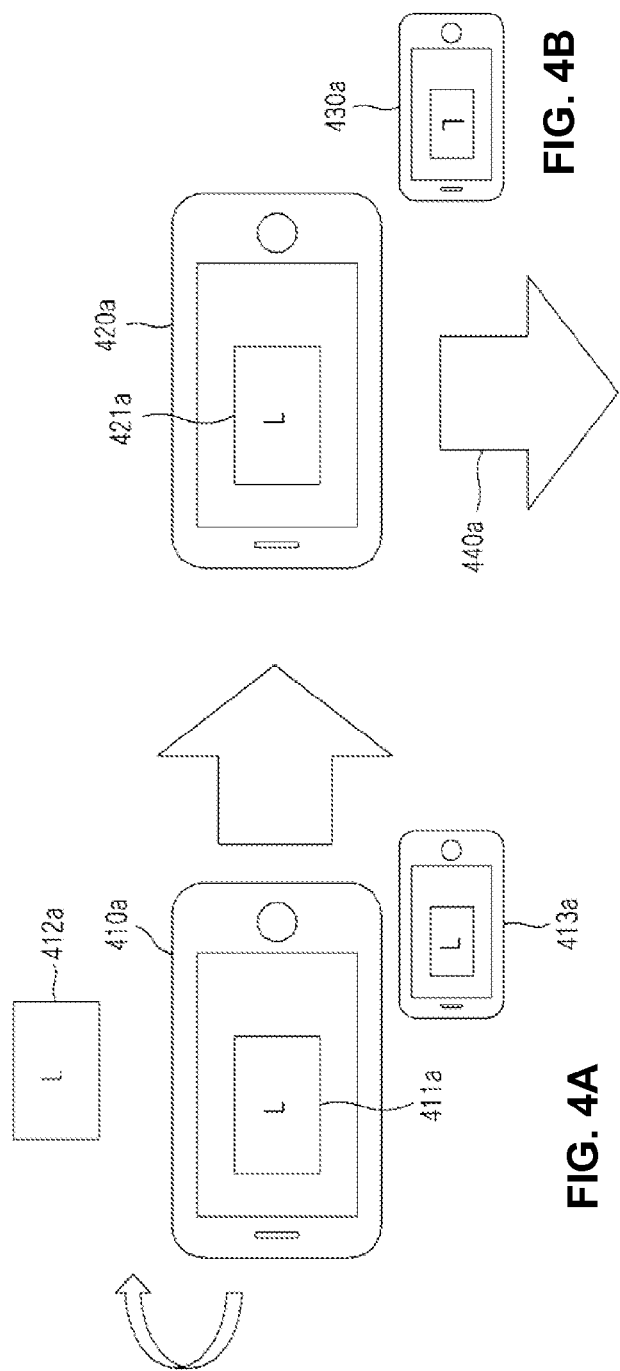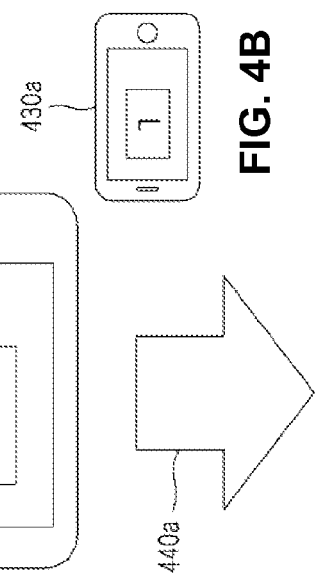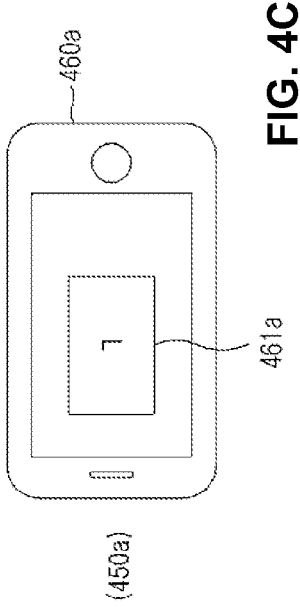

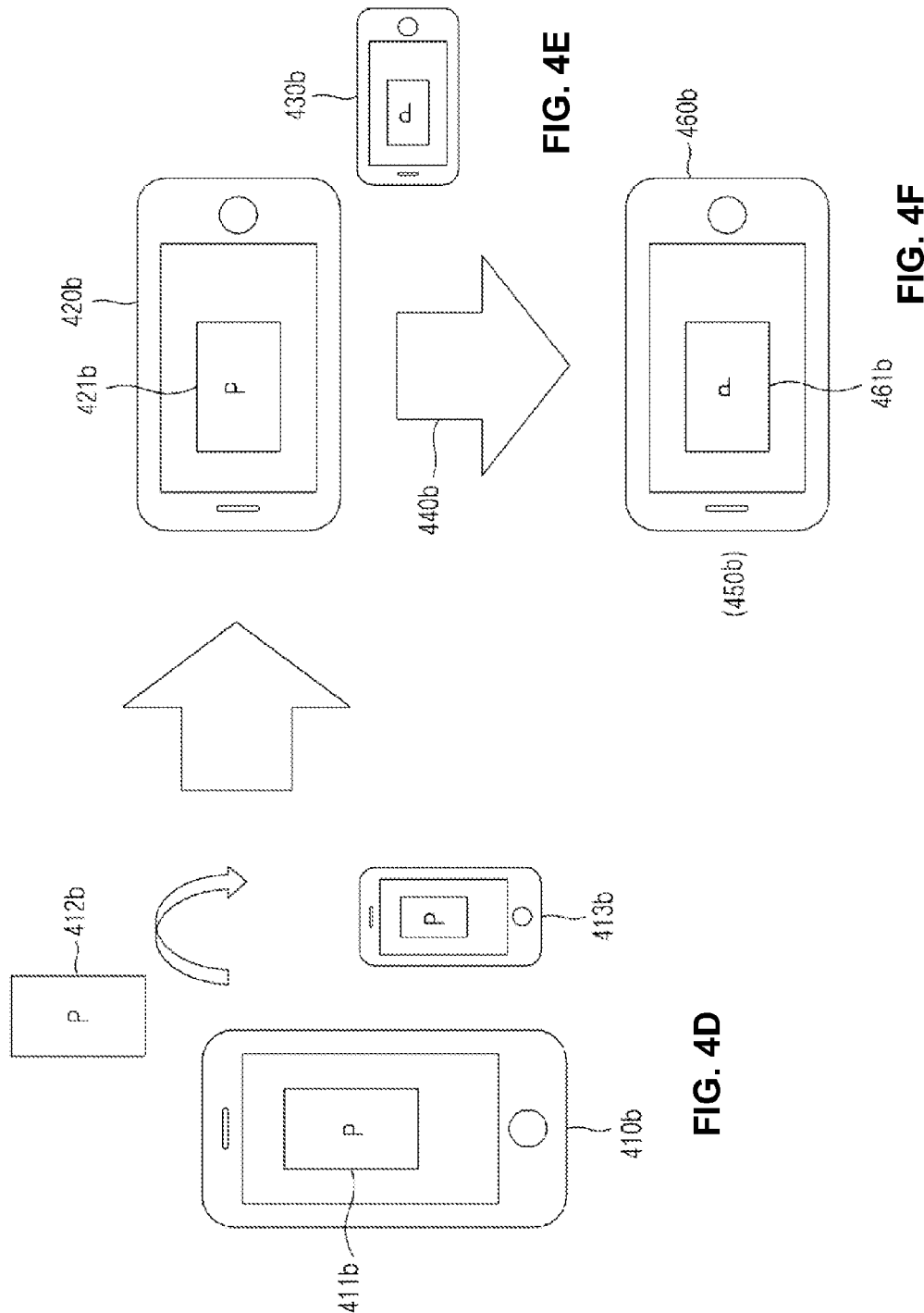

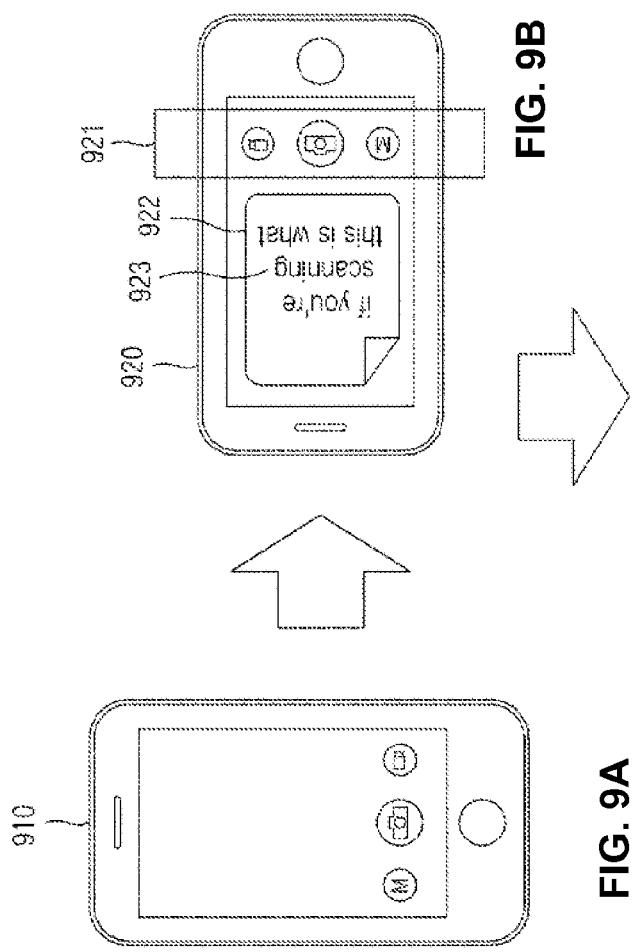

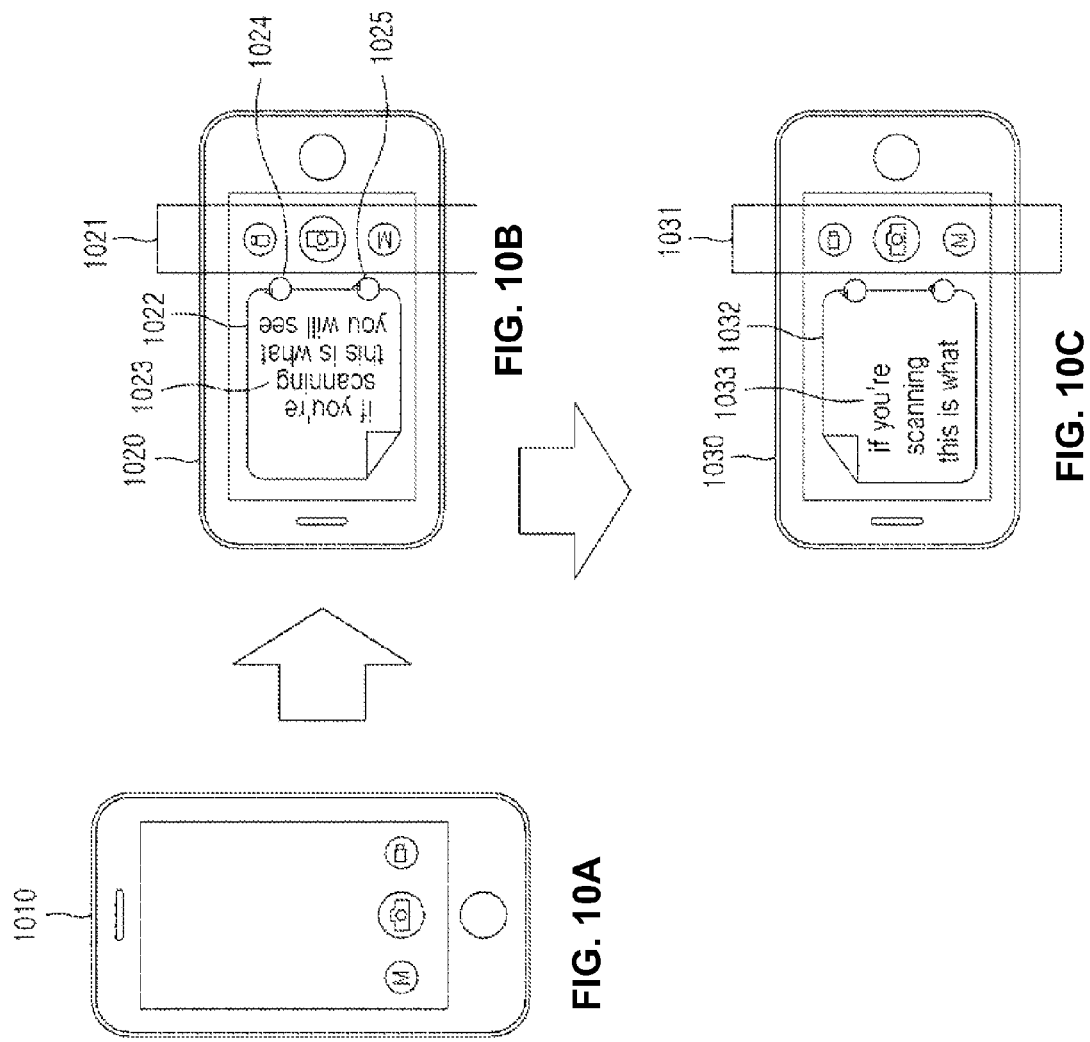

METHOD AND APPARATUS FOR ADJUSTING CAMERA TOP-DOWN ANGLE FOR MOBILE DOCUMENT CAPTURE

CROSS REFERENCE TO RELATED APPLICATIONS

This application claims the benefit of priority to Korean Patent Application Serial No. 10-2014-0136947, filed Oct. 10, 2014, incorporated herein by reference.

BACKGROUND

The inventive concepts described herein relate to a method and device capable of capturing or scanning a mobile document using a mobile device.

A conventional mobile terminal uses a device's default orientation as a shooting angle (e.g., portrait or landscape) and this orientation is automatically detected by using a gravity sensor. The portrait mode is detected by sensing gravity in the y axis of the gravity sensor. Similarly, landscape mode is detected by sensing gravity in the x axis of the gravity sensor.

A mobile document scan typically occurs when a picture of a document (usually on a table) is captured using a camera from a mobile terminal. In this case, the mobile terminal is perpendicular to the direction of gravity and we call this a top-down angle or top-down shooting mode. A picture's default orientation is determined by the mobile terminal's current orientation detected just prior to shooting. However, orientation sensing does not typically work with a top-down angle, particularly when it is based on gravity sensing in the x and y axes. In other words, any rotations that were produced from the top-down angle cannot be detected by the mobile terminal. This causes a mismatch between a detected (i.e., camera) orientation and an actual (i.e., shooting) orientation of the terminal in the top-down angle used for document capturing.

SUMMARY

One aspect of the inventive concept is to provide a method for adjusting a camera top-down angle for a mobile terminal. The method includes detecting automatically whether a mobile terminal camera is set to top-down shooting mode based on the z-axis of a mobile terminal acceleration sensor. In addition, this method automatically adjusts an orientation of the camera using a mobile terminal gyroscope sensor when the camera is set to top-down shooting mode.

Another aspect of the inventive concept is to provide a method of adjusting a camera top-down angle of a mobile terminal. The method includes detecting automatically whether a camera of the mobile terminal is set to a top-down shooting mode based on the z-axis of an acceleration sensor of the mobile terminal. In addition, it displays the mobile terminal camera orientation so that a user can intuitively recognize the camera orientation and then manually adjust the camera orientation when it does not correspond to the shooting orientation.

A third aspect of the inventive concept is to provide a method of adjusting a camera top-down angle of a mobile terminal. The method includes detecting automatically whether a camera of the mobile terminal is set to a top-down shooting mode based on the z-axis of an acceleration sensor of the mobile terminal. In addition, this method adjusts automatically the orientation of the camera by means of a gyroscope sensor of the mobile terminal when the camera is set to the top-down shooting mode. Furthermore, it displays a camera orientation of the mobile terminal such that a user can intuitively recognize the camera orientation and manually adjust the camera orientation when it does not correspond to the shooting orientation.

Automatic detection may involve detecting a case in which a value extracted from the acceleration sensor belongs to a predetermined range. The detected state is referred to the top-down shooting mode of the mobile terminal). This process uses at least one of the following: a z-axis value extracted from mobile terminal's acceleration sensor, an absolute z-axis value, or specific values extracted from z-axis samples observed in a predetermined time window.

Automatic adjusting may involve adjusting the orientation of the camera by recognizing, as a rotation event of the mobile terminal, a case in which a rotation angle obtained by integrating the rotating angular velocity of the mobile terminal's gyroscope sensor is greater than or equal to a predetermined value.

The rotation angle may include both clockwise and counterclockwise rotation angles. When each of the clockwise and counterclockwise rotation angles is greater than or equal to the predetermined value, corresponding rotations at the mobile terminal may be classified based on the respective rotation angles. This is performed for the purpose of recognizing rotation events in the mobile terminal.

Manual adjusting may involve displaying an overlay guide screen that corresponds to the camera orientation on the mobile terminal's viewfinder screen or by using an alert including a vibration, warning sound, or LED light. This allows a user to recognize intuitively the orientation of the camera.

The overlay guide screen may be activated or deactivated by means of a single step in the viewfinder screen.

The overlay guide screen may include user interfaces for manually adjusting the camera orientation.

A method for manually adjusting the camera orientation may include using a specific gesture as well as user-interaction information marks when the camera orientation does not correspond to the shooting orientation.

The method may also involve adjusting a picture's direction by rotating it after the photograph has been captured and without changing the camera orientation (i.e., the user's point of view) by using the mobile terminal's gyroscope sensor.

Accuracy may be improved by using only portrait and landscape as the camera's orientation mode camera such that the number of cases is limited.

A camera top-down angle-adjusting system for a mobile terminal is further provided and includes the following units: automatic shooting-mode detection, automatic adjustment, and manual adjustment. The automatic shooting-mode detection unit automatically detects whether a mobile terminal camera is set to top-down shooting mode based on the z-axis of the mobile terminal's acceleration sensor. The automatic adjustment unit automatically adjusts the camera's orientation by means of the mobile terminal's gyroscope sensor when the camera is set to top-down shooting mode. The manual adjustment unit displays the camera's orientation at the mobile terminal such that a user can intuitively recognize the orientation of the camera and manually adjust the orientation of the camera when it does not correspond to the orientation of the shooting mode.

The automatic shooting-mode detection unit may detect automatically a case in which a feature value extracted from the acceleration sensor belongs to a predetermined range (i.e., the detected state is referred to the top-down shooting mode of the mobile terminal) by processing z-axis values from the mobile terminal's acceleration sensor. The feature value can be at least one of the following: a z-axis value, an absolute value of the z-axis value, or the statistical summary statistics of z-axis samples observed in a predetermined time window (e.g., mean, standard deviation, percentiles).

The automatic adjustment unit may automatically adjust the orientation of the camera by recognizing, as a rotation event of the mobile terminal, a case in which a rotation angle obtained by integrating a rotating angular velocity of the mobile terminal's gyroscope sensor is greater than or equal to a predetermined value.

The manual adjustment unit may display an overlay guide screen corresponding to the camera orientation on the mobile terminal display or employ an alert, including a vibration, warning sound, or LED light so that a user recognizes the camera orientation.

BRIEF DESCRIPTION OF FIGURES

The previous discussion as well as objects and features associated with the system will perhaps become more intelligible after we describe the following figures used in this study. Numerals refer to like parts throughout the various figures unless otherwise specified.

FIGS. 2A, 2B, 2C, 2D, 2E, 2F, 2G, and 2H illustrate a camera's viewfinder screen in a top-down angle when both correct and incorrect camera orientations are used based on a conventional technique.

FIGS. 3A, 3B, and 3C illustrate a correct camera shooting orientation in a top-down angle based on a conventional technique.

FIGS. 4A, 4B, 4C, 4D, 4E, and 4F illustrate a case of incorrect shooting in which the shooting orientation in a top-down angle differs from a device orientation based on a conventional technique.

FIGS. 9A, 9B, and 9C show the method of manually adjusting camera orientation.

FIGS. 10A, 10B, and 10C illustrate another method of manually adjusting camera orientation.

DETAILED DESCRIPTION

Figure 1A:
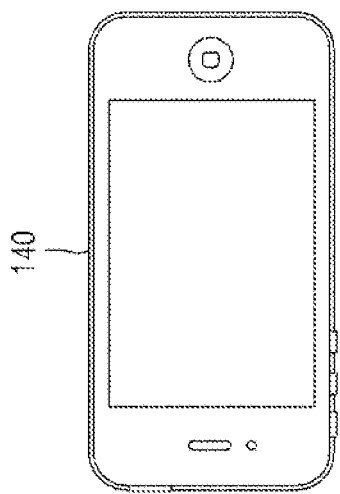
FIGS. 1A, 1B, 1C, and 1D show a shooting orientation in a top-down angle.
Figure 1B:
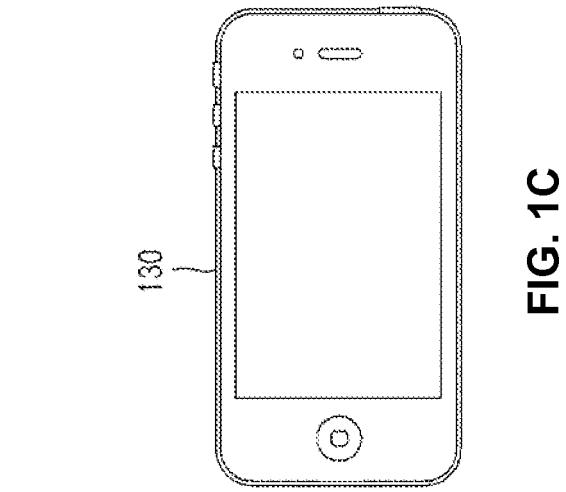
Figure 1C:
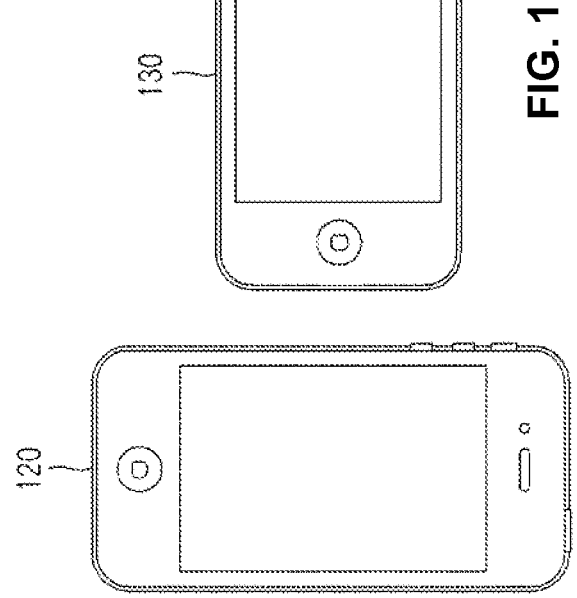

Embodiments will be described in detail with reference to the accompanying drawings. The inventive concept, however, may be embodied in various different forms, and should not be construed as being limited only to the illustrated embodiments. Rather, these embodiments are provided as examples so that this disclosure will be thorough and complete, and will fully convey the concept of the inventive concept to those skilled in the art. Accordingly, known processes, elements, and techniques are not described with respect to some of the embodiments of the inventive concept. Unless otherwise noted, like reference numerals denote like elements throughout the attached drawings and written description, and thus descriptions will not be repeated. In the drawings, the sizes and relative sizes of layers and regions may be exaggerated for clarity.

It will be understood that, although the terms "first", "second", "third", etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the inventive concept.

Spatially relative terms, such as "beneath", "below", "lower", "under", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" or "under" other elements or features would then be oriented "above" the other elements or features. Thus, the exemplary terms "below" and "under" can encompass both an orientation of above and below. The device may be otherwise oriented (rotated 90 degrees or at other orientations) and the spatially relative descriptors used herein interpreted accordingly. In addition, it will also be understood that when a layer is referred to as being "between" two layers, it can be the only layer between the two layers, or one or more intervening layers may also be present.

The terminology used herein is for the purpose of describing particular embodiments only and is not intended to be limiting of the inventive concept. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Also, the term "exemplary" is intended to refer to an example or illustration.

It will be understood that when an element or layer is referred to as being "on", "connected to", "coupled to", or "adjacent to" another element or layer, it can be directly on, connected, coupled, or adjacent to the other element or layer, or intervening elements or layers may be present. In contrast, when an element is referred to as being "directly on," "directly connected to", "directly coupled to", or "immediately adjacent to" another element or layer, there are no intervening elements or layers present.

Unless otherwise defined, all terms (including technical and scientific terms) used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and/or the present specification and will not be interpreted in an idealized or overly formal sense unless expressly so defined herein.

FIGS. 1A, 1B, 1C and 1D illustrate the shooting orientation of a top-down angle.

Figure 1D:
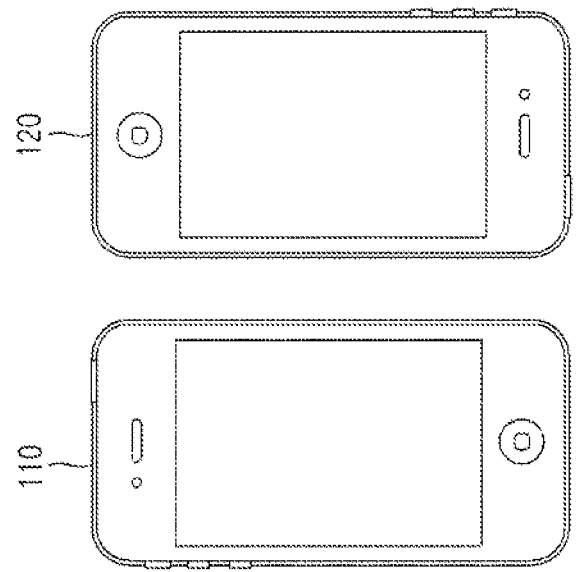
Figure 2E:
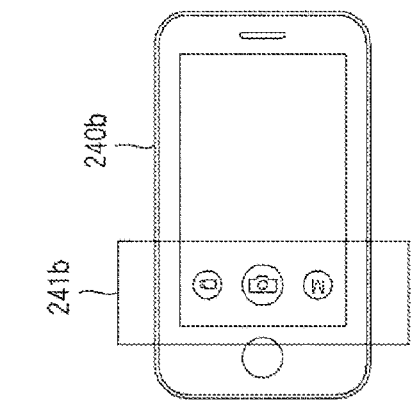
Figure 2F:
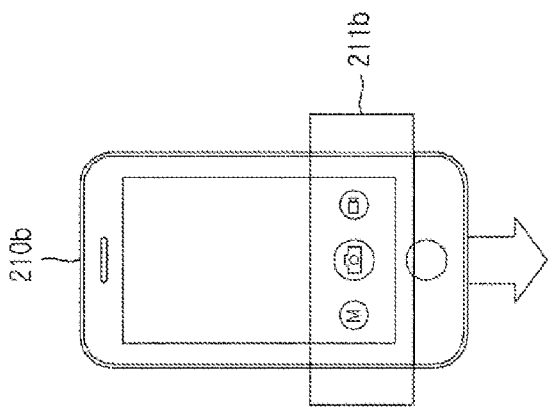
Figure 2G:
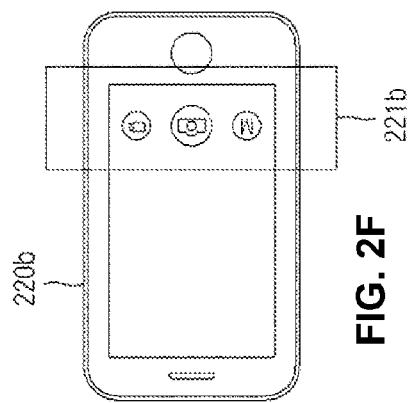
Figure 2H:
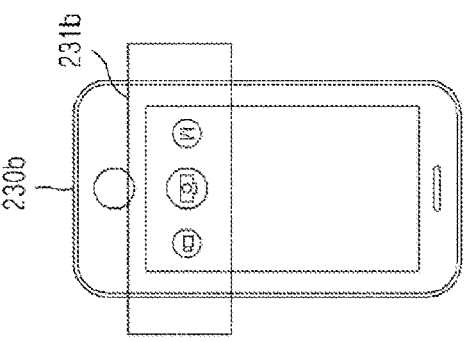

Referring to these figures, a camera's shooting orientation includes four possible orientations: Portrait 110 (FIG. 1A), Upside Down 120 (FIG. 1B), Landscape Left 130 (FIG. 1C), and Landscape Right 140 (FIG. 1D). The orientations may be exemplary. In addition, the camera's shooting orientation may include a variety of shooting orientations. The Portrait 110 and Landscape Right 140 are frequently used in the mobile terminal camera. The Upside Down 120 and Landscape Left 130 can be considered unnatural as initial orientations. However, if the user is left-handed, Landscape Left 130 is used more frequently than Landscape Right 140.

FIGS. 2A, 2B, 2C, 2D, 2E, 2F, 2G, and 2H illustrate a camera's viewfinder screen for a top-down angle when both correct and incorrect camera orientations are used based on a conventional technique.

These figures show a camera's viewfinder screen for a correct camera orientation. As shown, icons on the menu tab line on the camera's viewfinder screen are rotated according to the shooting orientation. For example, in a portrait shooting orientation, icons 211a (FIG. 2A) appearing on the menu tab line are placed on the camera's viewfinder screen 210a in a forward direction, which indicates the correct camera orientation. In the landscape-right shooting orientation, icons 221a (FIG. 2B) on the menu tab line rotate 90 degrees clockwise and are then placed on the camera's viewfinder screen 220a. In the upside-down shooting orientation, icons 231a (FIG. 2C) on the menu tab line rotate 180 degrees and are then placed on the camera's viewfinder screen 230a. In the landscape-left shooting orientation, icons 241a (FIG. 2D) on the menu tab line rotate 90 degrees counterclockwise and are then placed on the camera's viewfinder screen 240a.

These figures also show a camera's viewfinder screen in a top-down angle with incorrect camera orientations. As shown, the icons on the menu tab line on the camera's viewfinder screen are not correctly aligned with the shooting orientation. This situation occurs when a mobile terminal rotates. However, this event is not detected by the camera, resulting in an incorrect camera orientation. Each shooting orientation may have three incorrect camera orientations. In the portrait shooting orientation, icons 211b (FIG. 2E) on the menu tab line are placed on the camera's viewfinder screen 220a in a forward direction, which indicates a correct camera orientation. In the landscape-right shooting orientation, icons 221b (FIG. 2F) on the menu tab line on the camera's viewfinder screen 220b are incorrect because the camera fails to detect that the camera orientation has changed from portrait to landscape-left orientation. In the upside-down shooting orientation, icons 231b (FIG. 2G) on the menu tab line of the camera's viewfinder screen 230b are still in a forward direction, which requires a 180-degree rotation to produce a correct camera orientation. In the landscape-left shooting orientation, icons 241b (FIG. 2H) on the menu tab line of the camera's viewfinder screen 240b are in a forward direction, which requires a 90-degree rotation counterclockwise to produce a correct camera orientation.

FIGS. 3A, 3B, and 3C show a correct camera shooting orientation in a top-down angle based on a conventional technique.

When photographed in the landscape-right shooting orientation 313, object 312 is displayed on a camera's viewfinder screen 310, as shown in FIG. 3A. In other words, it is possible to capture a photo of object 321 with a mobile terminal 320 that is set to landscape-right shooting orientation 330 (FIG. 3B) and when its device orientation is landscape left (refer to 340 in FIG. 3). Referring to a photograph captured by a mobile terminal 360 that is set to landscape-right shooting orientation 330 and its device orientation is set to landscape-left orientation, the orientation of object 321 corresponds to the orientation of picture 361 (refer to 350 in FIG. 3C).

FIGS. 4A, 4B, 4C, 4D, and 4F illustrate a case of incorrect shooting in which a shooting orientation in a top-down angle differs from a device orientation based on a conventional technique.

FIGS. 4A, 4B, and 4C show an example of incorrect shooting in a top-down angle. Here, when photographed in the landscape-right orientation 413a, object 412a is displayed on camera viewfinder screen 410a, as illustrated in FIG. 4A. At this time, it is assumed that a user rotates mobile terminal 420a 180 degrees clockwise in the top-down angle. In this case, object 421a (FIG. 4B) on the viewfinder screen does not change, but the shooting orientation changes to landscape-left. In the top-down angle, this kind of horizontal rotation is not detected and, therefore, the camera orientation (from the previous shooting session) may remain incorrect. In other words, the landscape right 430a is maintained. This means that object 421a is captured with mobile terminal 420a, in which the camera orientation is incorrectly set and does not match the current shooting orientation (refer to 440a in FIG. 4A). Referring to a photo captured by a mobile terminal 460a (FIG. 4C, in which the camera orientation is landscape right 430a and the shooting orientation is landscape right 420a), the orientation of object 421a does not correspond to that of picture 461a, which is previewed after it was captured (refer to 450a in FIG. 4C).

FIGS. 4D, 4E, and 4F show another example of incorrect shooting in a top-down angle. When photographed in portrait mode 413b, object 411b is displayed on a camera viewfinder screen 410b, as illustrated in FIG. 4D. At this time, it is assumed that a user rotates mobile terminal 420b (FIG. 4E) 90 degrees clockwise in the top-down angle. In this case, object 421b on the viewfinder screen does not change, but the shooting orientation changes to landscape left. In a top-down angle, this kind of rotation is not detected and the camera orientation (i.e., from the previous shooting session) may remain incorrect. In other words, portrait mode 430b is maintained. This means that object 421b is captured with mobile terminal 420b in which the camera orientation is incorrectly set and does not match the current shooting orientation (refer to 440b in FIG. 4E). Referring to a photo captured by mobile terminal 460b (in which the camera orientation was set to portrait mode 430b and the shooting orientation was set to landscape left 420b), the orientation of object 421b does not correspond to the orientation of picture 461b, which is previewed after it was captured (refer to 450b in FIG. 4F).

The aforementioned problem may arise because a user typically does not recognize that a current shooting orientation matches a camera orientation, despite the fact that camera orientations are represented as icons on a menu tab line on the camera viewfinder screen (FIG. 2A). In general, the camera orientation is changed without errors in normal shooting angles. However, as shown earlier, in the top-down angle, errors in camera orientations are commonly observed.

Because document capturing occurs infrequently, the user will not attentively monitor camera orientation.

As previously described regarding FIG. 2 and FIG. 3, icons placed near a home button at the bottom of a viewfinder screen automatically rotate whenever the camera orientation changes. However, a user typically does not recognize this fact, because his or her focal attention is on the object and not on the icons. Thus, to solve this difficulty of recognizing mismatch during the top-down photographic process in a conventional mobile terminal, a technique for helping users recognize camera orientation is required. In addition, the ability to change the camera orientation automatically based on the shooting orientation in a top-down angle is also necessary.

Figure 5:
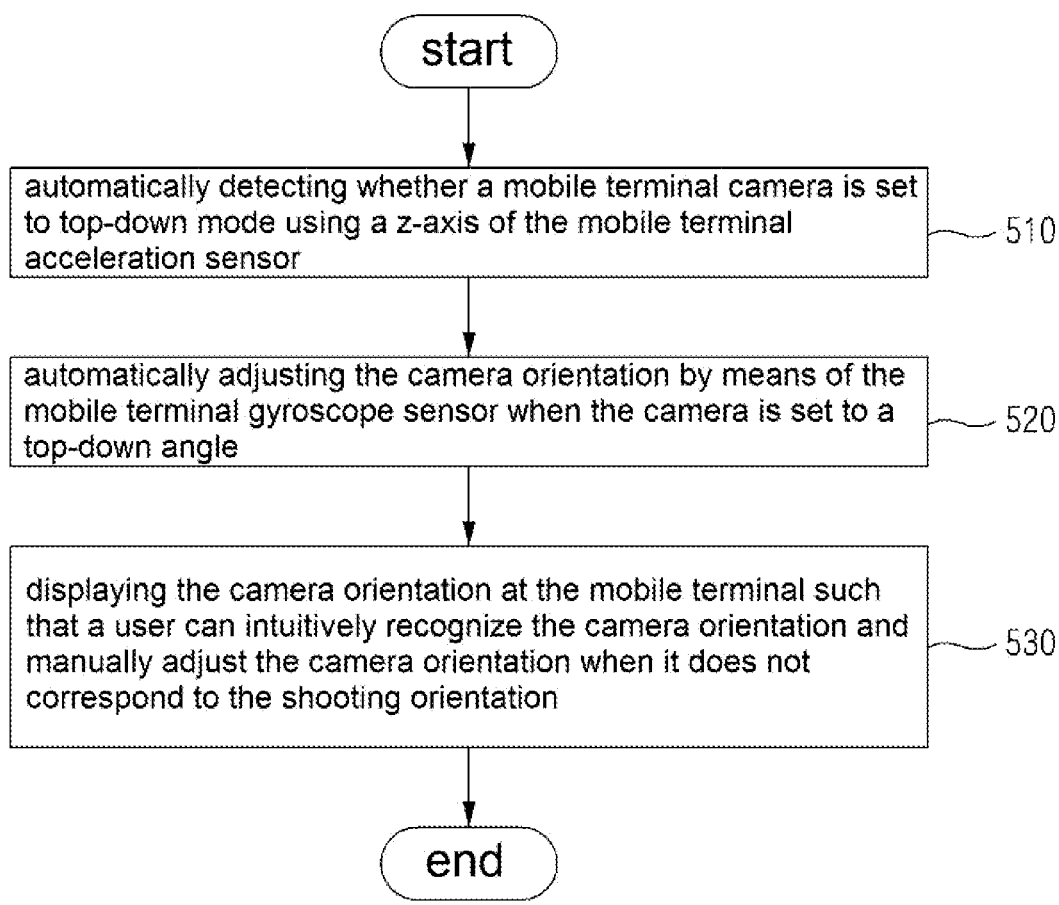
FIG. 5 is a flow chart that presents a method for adjusting the camera orientation in a top-down angle for mobile document capture.

FIG. 5 is a flow chart that illustrates a method of adjusting the camera orientation in a top-down angle for mobile document capture.

A method of adjusting the camera orientation in a top-down angle for mobile document capture involves the following steps: automatically detecting whether a mobile terminal camera is set to top-down mode using a z-axis of the mobile terminal acceleration sensor (510); automatically adjusting the camera orientation by means of the mobile terminal gyroscope sensor when the camera is set to a top-down angle (520); displaying the camera orientation at the mobile terminal such that a user can intuitively recognize the camera orientation and manually adjust the camera orientation when it does not correspond to the shooting orientation (530).

In certain cases, the method of adjusting the camera orientation in the mobile terminal top-down angle based on the inventive concept includes steps to: automatically detect whether the mobile terminal camera is set to a top-down angle using a z-axis of the mobile terminal acceleration sensor (510); and automatically adjust a camera orientation by means of the mobile terminal gyroscope when the camera is set to a top-down angle (520).

In other examples, the method of adjusting the camera orientation in the mobile terminal top-down angle according to the inventive concept includes steps to: automatically detect whether the mobile terminal camera is set to the top-down angle using a z-axis of the mobile terminal acceleration sensor (510); and display a camera orientation at the mobile terminal such that the user can intuitively recognize the camera orientation and manually adjust the camera orientation when it does not correspond to the shooting orientation (530).

In still other examples, the method of adjusting the camera orientation in the mobile terminal top-down angle based on the inventive concept involves steps to: automatically detect whether the mobile terminal camera is set to a top-down angle using a z-axis of the mobile terminal acceleration sensor (510); automatically adjust a camera orientation by means of the mobile terminal gyroscope sensor when the camera is set to a top-down angle (520); and display the camera orientation at the mobile terminal such that the user can intuitively recognize the camera orientation and manually adjust it when it does not correspond to the shooting orientation (530).

In step 510, the method automatically detects whether the mobile terminal camera is set to a top-down angle using the z-axis of the mobile terminal acceleration sensor. During this automatic detection, a value extracted from the acceleration sensor belonging to a predetermined range is automatically detected as a top-down angle of the mobile terminal. This is accomplished by means of at least one of the following: a z-axis value extracted from the mobile terminal acceleration sensor, an absolute value of the z-axis value, or particular values extracted from z-axis samples observed in a constant time window. The particular values may include an average of z-axis data, a z-axis standard deviation, or an analysis value of a frequency component of the z-axis.

In other words, a z-axis value is used without modification. For robust operations, a window (e.g., last 0.5 s or latest 10 samples) may be defined such that summary statistics are calculated (e.g., mean, standard deviation). For more sophisticated detection, general machine-learning methods are used. For example, a top-down mode may be detected using a decision tree that is built based on a training dataset. As shown previously, machine-learning methods use a set of features that are extracted from a given window (e.g., mean, standard deviation, and maximum). A method that utilizes a predefined threshold of the z-axis values is considered a simple form of the decision tree.

In addition, the same method of using an absolute z-axis value to detect the top-down angle may be applied to capture a photo of an object on a ceiling. In this case, the shooting angle is known as bottom-up.

Figure 6:
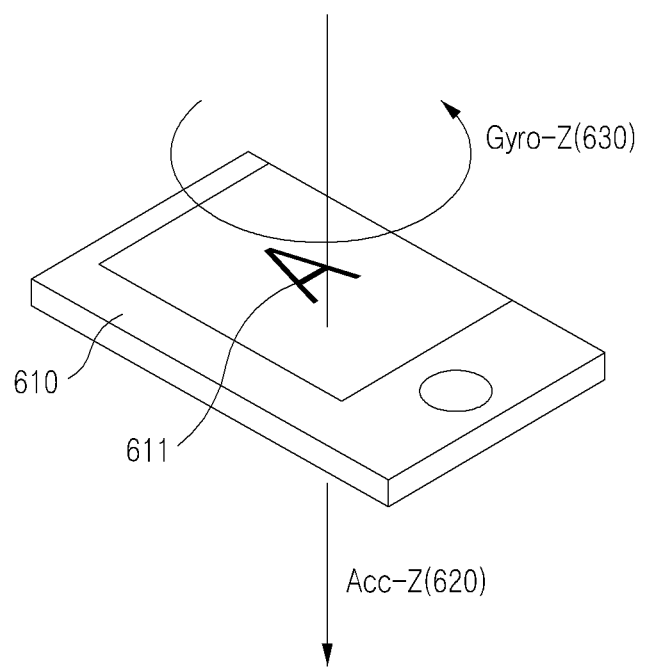
FIG. 6 illustrates a method that uses an axis of the acceleration sensor based on the inventive concept developed in this study.

FIG. 6 illustrates a method using an axis of an acceleration sensor according to the inventive concept.

Referring to FIG. 6, object 611 is displayed by mobile terminal 610 and a top-down shooting mode of mobile terminal 610 is detected using z-axis (ACC-Z) 620 of an acceleration sensor of mobile terminal 610, an average of z-axis data, and a z-axis standard deviation.

The z-axis may vary according to the position of the acceleration sensor in mobile terminal 610. For this reason, in FIG. 6, a direction perpendicular to a display of the mobile terminal 610 is defined as the z-axis.

If the x- or y-axis values of an acceleration sensor is within some range near the gravity value (e.g., the earth's gravity of $g=9.8$ m/s$^2$), we treat this event as a top-down shooting mode. An actual test result from a user study revealed that a document is photographed when the absolute value of z-axis (ACC-z) 620 of the acceleration sensor ranges from 9.5 to 10.1 m/s$^2$. During shooting, a standard deviation may also be used to determine whether a camera reaches a stable state for a top-down angle before a camera shutter button is pressed. The stable state of the top-down angle may be used to exclude a transition state in which a user repositions a device to fit an object on a screen in top-down mode. An orientation system that employs the acceleration sensor does not function when an absolute value of the z-axis 620 of the acceleration sensor exceeds 8.8 m/s$^2$. The orientation system based on the inventive concept functions in a range in which a conventional orientation system does not and is thus improvement over a conventional system. A method of automatically detecting a top-down shooting angle is more fully understood by referring to FIG. 7.

Figure 7B:
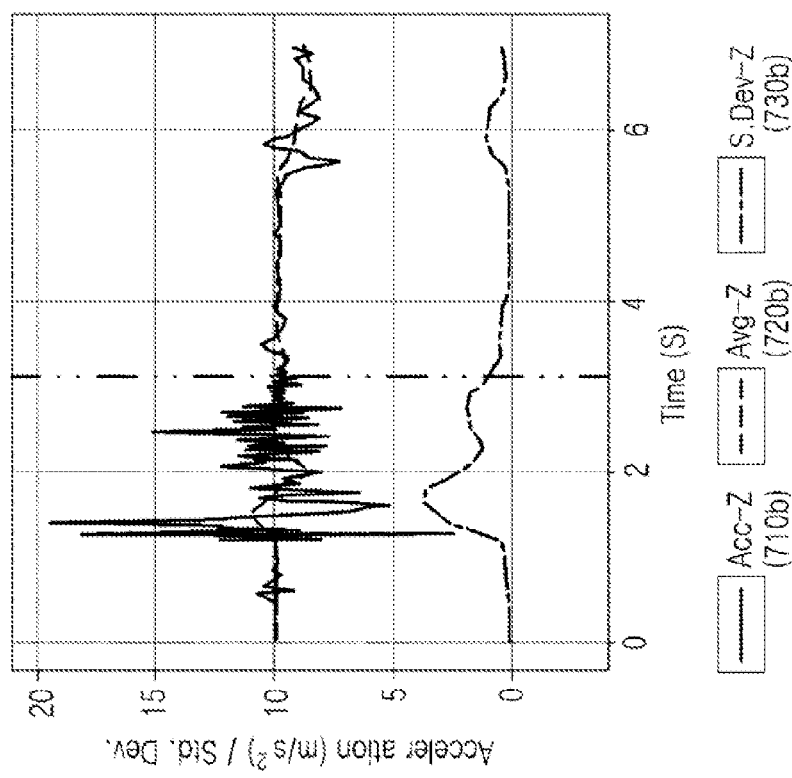
FIGS. 7A and 7B present the method for automatically detecting a mobile-terminal top-down shooting angle using the z-axis of an acceleration sensor.
Figure 7A:
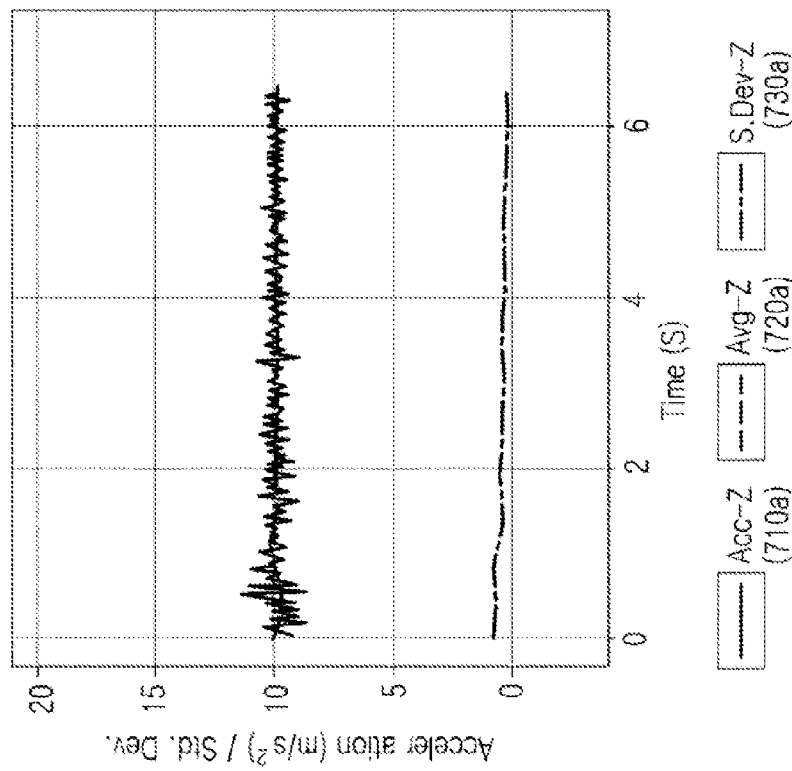

FIGS. 7A and 7B illustrate one aspect of a method for automatically detecting a mobile terminal top-down shooting angle using the z-axis of an acceleration sensor.

FIG. 7A shows a graph indicating z-axis values of an acceleration sensor having no rotation. In a horizontal state, the direction of gravity is detected by means of the fact that a gravitational force is on a z-axis direction of the acceleration sensor. Illustrated in FIG. 7A are a z-axis value 710*a*, an average of z-axis data (Avg-Z) 720*a*, and a z-axis standard deviation (S.Dev-Z) 730*a*. In addition, a top-down shooting mode of a mobile terminal is detected.

FIG. 7B shows a graph indicating z-axis values of an acceleration sensor having rotation. Values of an acceleration sensor are illustrated as the power-on event of a mobile terminal until a shutter button is pressed. As in FIG. 7A, this figure shows a z-axis value 710b, an average of z-axis data (Avg-Z) 720b, and a Z-axis standard deviation (S.Dev-Z) 730b. FIG. 7B shows that when a user rotates the mobile terminal, the time mark is denoted using a long line alternating with two dashes and the mobile terminal enters a top-down mode. In this shooting mode, an absolute value 710b of a z-axis value then approximates 9.8 m/s$^2$ and a z-axis standard deviation 730b approximates 0.

Returning to FIG. 5, when a camera is set to top-down shooting mode in step 520, the camera orientation is automatically adjusted using a mobile terminal gyroscope sensor. When a rotation angle obtained by integrating an angular velocity of the mobile terminal gyroscope sensor is greater than or equal to a predetermined value (i.e., an absolute value is greater than or equal to a predetermined value), this may be recognized as a rotation event in the mobile terminal. The camera orientation is then automatically adjusted. The rotation angle includes clockwise and counterclockwise rotation angles. When each rotation angle is greater than or equal to the predetermined value, rotations in the mobile terminal are classified based on the respective rotation angles. This is performed for the purpose of recognizing rotation events in the mobile terminal.

In other words, the orientation is automatically adjusted using the gyroscope sensor (for measuring a three-dimensional (3D) rotating angular velocity) built in the mobile terminal. The rotation angle is obtained by integrating the rotating angular velocity that the gyroscope sensor measures. Returning to FIG. 6, when an integral value (Gyro-Z) 620 is greater than or equal to a predetermined value, the method may detect it as a rotation event. At this time, when integral values related to the counterclockwise and clockwise rotations are greater than or equal to a predetermined threshold, this may be recognized as a rotation event.

Figure 8B:
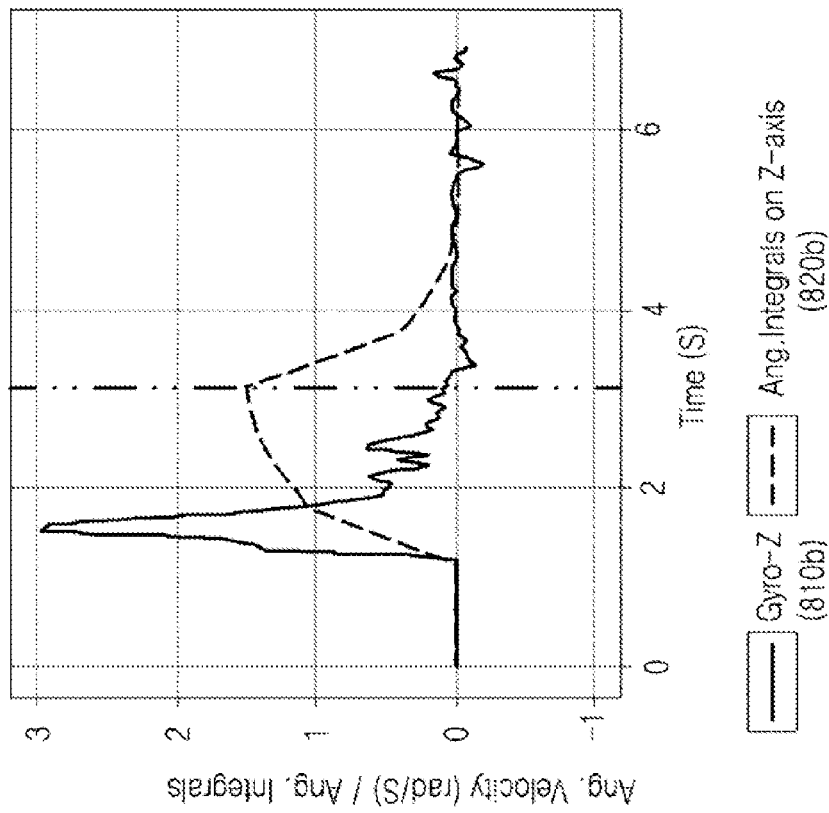
FIGS. 8A and 8B illustrate the method of adjusting camera orientation using a mobile terminal's gyroscope sensor.
Figure 8A:
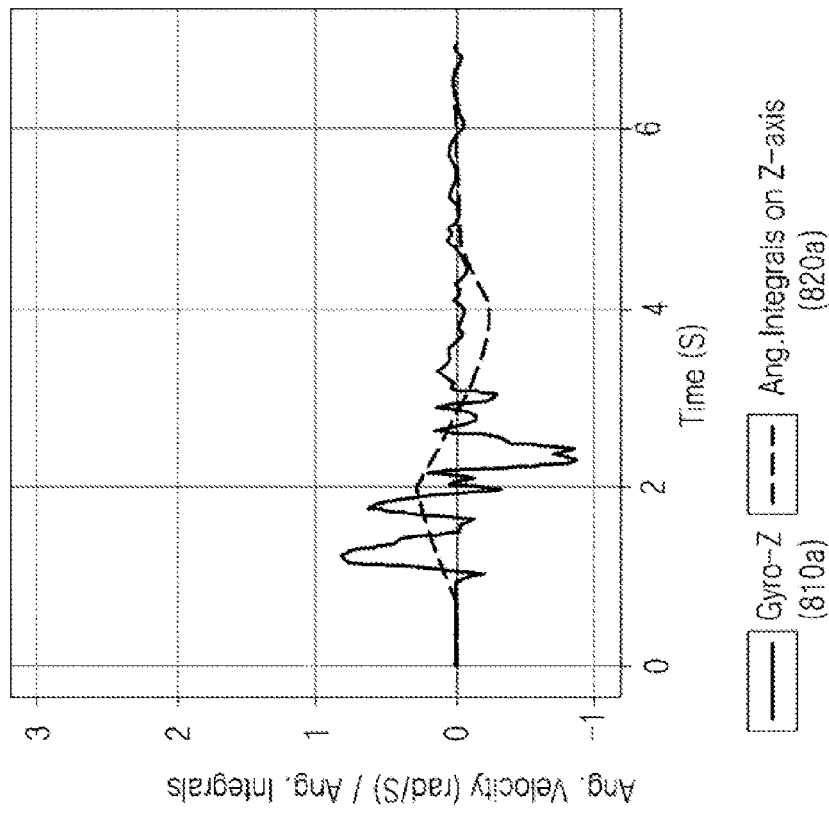

When the top-down mode is not detected in step 510, the orientation calculated using a rotation detected in step 520 is not applied. In other words, when the current mode is not the top-down mode, a gravity-based orientation method from a conventional system is used. FIGS. 8A and 8B provide a more complete illustration of the method for adjusting a camera orientation.

FIGS. 8A and 8B illustrate a method of adjusting a camera orientation using a mobile terminal gyroscope sensor.

A rotation angle is estimated by integrating a z-axis (Gyro-Z) 620 of a gyroscope sensor as shown in FIG. 6. FIG. 8A shows a Gyro-Z 810 and integral value (i.e., rotation angle) 820a associated with the Gyro-Z 810 in portrait mode. The figure shows what occurs when a user turns on a mobile terminal, rotates the mobile terminal for document capturing in landscape mode, and finally reaches the top-down shooting mode at the time mark denoted (using a long line alternating with two dashes). Thus, detecting the photographic process both in portrait mode without rotation and in landscape mode after rotation is possible. In other words, orientation changes are detected using z-axis values of the gyroscope sensor. When a rotation angle obtained by integrating a rotating angular velocity of the mobile terminal gyroscope sensor is greater than or equal to a predetermined value (i.e., an absolute value is greater than or equal to a predetermined value), it may be recognized as a rotation event of the mobile terminal. The camera orientation is then automatically adjusted. FIG. 8B shows a Gyro-Z 810B and integral value (i.e., rotation angle) 820B associated with the Gyro-Z 810B).

Returning to FIG. 5, in step 530, the camera orientation is displayed at the mobile terminal such that a user can intuitively recognize the camera orientation and manually adjust it when it does not correspond to the shooting orientation. At this time, the user can recognize the camera orientation reviewing the overlay guide screen corresponding to the camera orientation on the mobile terminal display or by means of alerts (e.g., a vibration, warning sound, or LED light). A method for manually adjusting the camera orientation may involve other methods of manually adjusting the camera orientation, such as using a gesture and user-interaction information marks when the camera orientation does not correspond to the shooting orientation.

Specifically, the overlay guide screen may be activated or deactivated in a single step. In other words, when top-down shooting mode is automatically detected, the overlay guide screen is displayed at the mobile terminal. The overlay guide screen may then be displayed using orientation information detected during an automatic adjusting step.

For example, for intuitive delivery of a camera orientation, the overlay guide screen may represent a conceptual metaphor of a copy paper using a document-shape overlay guide. A letter or shape (e.g., including straight and winding lines) that resembles a letter is displayed based on the camera orientation for the purpose of intuitively recognizing a capture orientation. In addition, the letter or shape may be displayed on the overlay guide screen and its background may be transparent in order not to interfere with the visibility of the target object.

The overlay guide screen may include user interaction marks (e.g., clockwise, and counterclockwise rotation buttons) used to manually adjust the camera orientation. Alternatively, the camera orientation may be manually adjusted using a gesture such as tilting.

A method of adjusting the camera orientation using the mobile terminal gyroscope sensor is not limited by this disclosure. For example, orientation metadata in a captured photo can be updated instead of adjusting the camera orientation. Invoking a system call that changes the camera orientation may require redrawing the viewfinder, and this redrawing may cause screen flickering. In this case, metadata updates are more preferable than camera-orientation adjustment.

In other examples, a user uses primarily two camera orientations (i.e., portrait and landscape modes); other orientations (i.e., upside-down and landscape-right mode) are rarely used. For this reason, the number of cases may be limited and the two camera orientations previously described are used to produce improved rotation direction accuracy. Furthermore, shooting mode is fixed to landscape-right when a user rotates the mobile terminal counterclockwise and to portrait when the user rotates it clockwise.

FIGS. 9A, 9B, and 9C show a method of manually adjusting a camera orientation.

These figures illustrate that a shooting mode of mobile terminal 910 is in portrait mode in the top-down angle (i.e., its camera orientation is portrait.) When mobile terminal 910 (FIG. 9A) rotates counterclockwise 90 degrees in a top-down angle, shooting mode has to be switched to landscape-right. However, the user may recognize that the shooting mode has not been correctly changed by means of the following: icons 921 (FIG. 9B) on the menu tab line, overlay guide screen 922, or letters 923 in a camera orientation that are displayed on the viewfinder screen of mobile terminal 920. Thus, a user recognizes that the mobile terminal camera orientation is incorrect and then tries to change the camera orientation. Front tilting is exemplary. For example, the camera orientation may be adjusted by rotating two fingers simultaneously and a page may be rotated by dragging it with one finger.

Icons 931 (FIG. 9C) on the menu tab line, overlay guide screen 932, and letters 933 are displayed in a direction corresponding to landscape-right mode such that they correspond to the camera orientation of mobile terminal 930.

FIGS. 10A, 10B, and 10C show another aspect of a method used to manually adjust the camera orientation.

These figures illustrate a portrait shooting mode of mobile terminal 1010 in a top-down angle in which its camera orientation is portrait. When mobile terminal 1010 (FIG. 10A) rotates 90 degrees counterclockwise in a top-down angle, the shooting mode has to be changed to landscape-right. However, the user should recognize that shooting mode has not been correctly switched by means of icons 1021 (FIG. 10B) on the menu tab, overlay guide screen 1022, and letters 1023 in a camera orientation that are displayed on a viewfinder screen of mobile terminal 1020. Thus, a user should recognize that a mobile terminal camera orientation is incorrect and then attempt to change the camera orientation.

For example, a screen direction may be switched using user interfaces 1024 and 1025 that are displayed on a viewfinder screen. When touching user interface 1024, the user change a shooting orientation to landscape-right in a counterclockwise rotation of 90 degrees. By contrast, when touching user interface 1025, the user changes the shooting orientation to landscape-left in a clockwise rotation of 90 degrees. Clockwise and counterclockwise rotations are exemplary. Rotations may be generated by various methods.

When touching user interfaces 1024, icons 1031 (FIG. 10C) on the menu tab line, an overlay guide screen 1032, and letters 1033 are positioned in a direction corresponding to landscape-right so that mobile terminal 1030 rotates 90 degrees counterclockwise.

Regarding the method of adjusting a camera top-down angle for mobile document capture, notifying a user that a top-down shooting mode is commenced using sound, vibration, or any other visible method (e.g., screen brightness or flash) is possible.

Enhancing the technique of detecting top-down shooting mode by means of a machine-learning method is also possible. The previously described method may be considered a threshold-based decision tree. A general machine-learning method can be used to detect top-down shooting mode and adjust the orientation more accurately. In other words, various machine-learning models (e.g., decision tree, Bayes, and support-vector machines) can be trained based on a learning dataset. Here, the dataset can be collected from n persons where n is defined as the number of persons. For model training, various features (e.g., average, standard deviation, max/min, and energy) can be extracted from various sensors including acceleration, compass, and gyroscope sensors.

Figure 11:
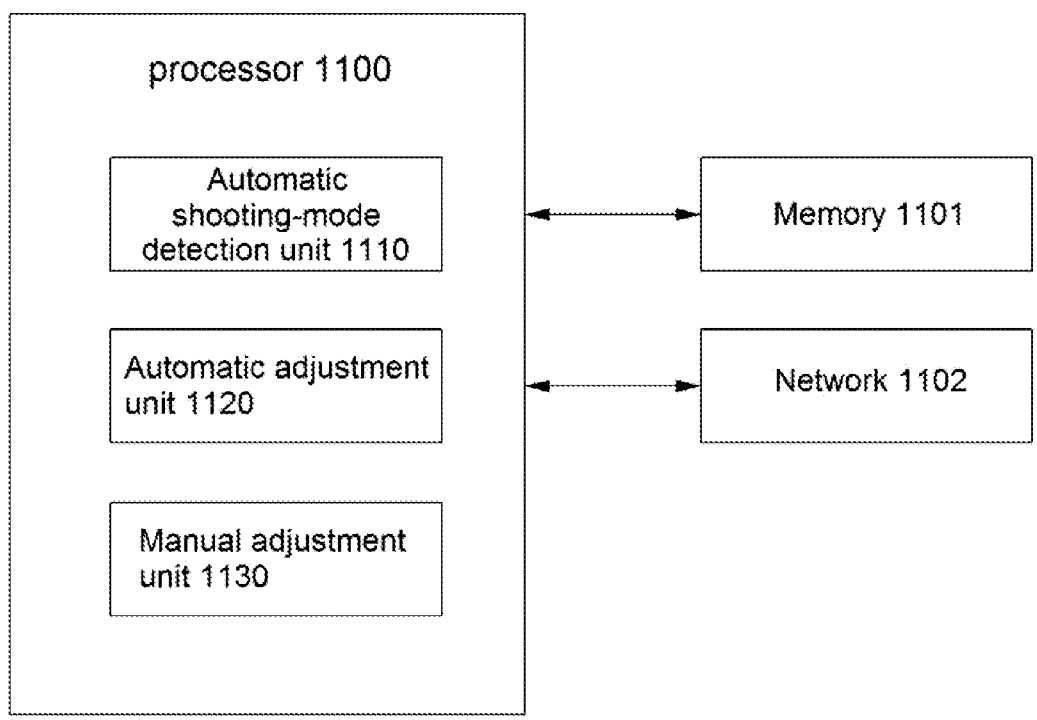
FIG. 11 presents a configuration of a camera top-down angle-adjusting system for mobile document capture based on the inventive concept developed in this study.

FIG. 11 shows a configuration of a camera top-down angle-adjusting system for mobile document capture based on the inventive concept described in this study.

FIG. 11 illustrates a camera top-down angle-adjusting system for mobile document capture that contains processor 1100, memory 1101, and network interface 1102. Processor 1100 includes automatic shooting-mode detection unit 1110, automatic adjustment unit 1120, and manual adjustment unit 1130.

The memory 1101 stores an operating system (OS) and a program including an instruction corresponding to a service routine for adjusting a camera top-down angle. The service routine for adjusting a camera top-down angle may detect a camera orientation in a top-down mode and may make automatic and manual adjustment using the detected result such that an object orientation corresponds to the camera orientation. Steps that a camera top-down angle adjusting system described with reference to FIGS. 1 through 10 performs may be executed by the program that the memory 1101 stores. For example, the memory 1101 may be a hard disk drive (HDD), a solid state drive (SSD), an SD card, and any other storage medium.

Network interface 1102 links the camera top-down angle-adjusting system with a network to communicate with user terminals that use a service for adjusting a camera top-down angle.

The processor 1100 is based on the instruction of the program stored at the memory 1101. The processor 1100 may include a microprocessor, such as a central processing unit (CPU).

Automatic shooting-mode detection unit 1110 automatically detects whether a mobile terminal camera is set to top-down shooting mode based on a z-axis of the mobile terminal acceleration sensor. During the detection process, the method automatically detects whether a value extracted from the acceleration sensor and belonging to a predetermined range is a top-down angle of the mobile terminal. This is accomplished using at least one of the following: a z-axis value extracted from the mobile terminal acceleration sensor, an absolute value of the z-axis value, or particular values extracted from z-axis samples observed on a constant time window. The particular values may include an average of z-axis data, a z-axis standard deviation, or an analysis value about a frequency component of the z-axis.

Automatic adjustment unit 1120 automatically adjusts the camera orientation using the mobile terminal gyroscope sensor when a camera is set to top-down shooting mode. When a rotation angle obtained by integrating an angular velocity of the mobile terminal gyroscope is greater than or equal to a predetermined value (i.e., an absolute value is greater than or equal to a predetermined value), automatic adjustment unit 1120 recognizes it as a rotation event of the mobile terminal. In this case, the unit automatically adjusts the camera orientation. This includes both clockwise and counterclockwise rotation angles. When each rotation angle is greater than or equal to the predetermined value (i.e., an absolute value is greater than or equal to the predetermined value), mobile terminal rotations are classified based on the respective rotation angles. This is conducted for the purpose of recognizing rotation events in the mobile terminal.

In other words, the orientation is automatically adjusted using the gyroscope sensor (for measuring a 3D rotating angular velocity) built in the mobile terminal. The rotation angle is obtained by integrating the rotating angular velocity that the gyroscope sensor measures. Returning to FIG. 6, when an integral value (Gyro-Z) is greater than or equal to a predetermined value, the method may detect it as a rotation event. At this time, when integral values related to the counterclockwise and clockwise rotations are greater than or equal to a predetermined threshold, this may be recognized as a rotation event.

Manual adjustment unit 1130 displays the camera orientation on the mobile terminal such that a user intuitively recognizes the camera orientation. This unit manually adjusts the camera orientation when it does not correspond to shooting mode.

At this time, the user recognizes the camera orientation based on the overlay guide screen corresponding to the camera orientation on the mobile terminal display or by means of an alert (e.g., vibration, warning sound, or LED light). A method of manually adjusting the camera orientation may include using a gesture and user-interaction information marks when the camera orientation does not correspond to the shooting orientation.

Specifically, the overlay guide screen may be activated or deactivated in a single step. In other words, when top-down shooting mode is automatically detected, the overlay guide screen is displayed at the mobile terminal. At this time, the screen may be displayed using orientation information detected in the automatic adjustment step.

For example, for intuitive delivery of a camera orientation, the overlay guide screen may represent a conceptual metaphor of a copy paper using a document-shape overlay guide. A letter or shape (e.g., including straight and winding lines) that resembles a letter is displayed based on the camera orientation for the purpose of intuitively recognizing a capture orientation. In addition, the letter or shape may be displayed on the overlay guide screen and its background may be transparent in order not to interfere with the visibility of the target object.

The overlay guide screen may include user-interaction marks (e.g., clockwise, counterclockwise, and rotation fixing button) used to manually adjust the camera orientation. Alternatively, the camera orientation may be manually adjusted using a gesture such as tilting.

A method of adjusting the camera orientation using the mobile terminal gyroscope sensor is not limited to this disclosure. For example, orientation metadata in a captured photo can be updated instead of adjusting the camera orientation. Invoking a system call that changes the camera orientation may require redrawing the viewfinder, and this redrawing may cause screen flickering. In this case, metadata updates are more preferable than camera-orientation adjustment.

In other examples, a user uses primarily two camera orientations (i.e., portrait and landscape mode); other camera orientations (i.e., upside-down and landscape-right mode) are rarely used. For this reason, the number of cases may be limited and the two camera orientations previously described are used to produce improved rotation direction accuracy. Furthermore, a shooting mode is fixed to landscape-right when a user continues to rotate the mobile terminal counterclockwise and to portrait when the user continues to rotate it clockwise.

The units described herein may be implemented using hardware components, software components, or a combination thereof. For example, devices and components described therein may be implemented using one or more general-purpose or special purpose computers, such as, but not limited to, a processor, a controller, an arithmetic logic unit, a digital signal processor, a microcomputer, a field programmable gate array (FPGA), a programmable logic unit, a microprocessor or any other device capable of responding to and executing instructions in a defined manner. A processing device may run an operating system (OS) and one or more software applications that run on the OS. The processing device also may access, store, manipulate, process, and create data in response to execution of the software. For the sake of easy understanding, an embodiment of the inventive concept is exemplified as one processing device is used; however, one skilled in the art will appreciate that a processing device may include multiple processing elements and multiple types of processing elements. For example, a processing device may include multiple processors or a processor and a controller. In addition, different processing configurations are possible, such as parallel processors.

The software may include a computer program, a piece of code, an instruction, or some combination thereof, for independently or collectively instructing or configuring the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. In particular, the software and data may be stored by one or more computer readable recording mediums.

The example embodiments may be recorded in non-transitory computer-readable media including program instructions to perform various operations embodied by a computer. The media may also include, alone or in combination with the program instructions, data files, data structures, and the like. The media and program instructions may be those specially designed and constructed for the purposes, or they may be of the kind well-known and available to those having skill in the computer software arts. Examples of non-transitory computer-readable media include magnetic media such as hard disks, floppy disks, and magnetic tape; optical media such as CD ROM disks and DVD; magneto-optical media such as floptical disks; and hardware devices that are specially to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be to act as one or more software modules in order to perform the operations of the above-described embodiments.

According to the inventive concept, after a top-down angle of a camera is automatically detected, automatic and manual adjustment may be produced such that an object orientation corresponds to the orientation of the camera shooting mode.

While the inventive concept has been described with reference to exemplary embodiments, it will be apparent to those skilled in the art that various changes and modifications may be made without departing from the spirit and scope of the inventive concept. Therefore, it should be understood that the above embodiments are not limiting, but illustrative.

What is claimed:
1. A method of adjusting a camera top-down angle of a mobile terminal that involves the following:
   automatically detecting whether a mobile terminal camera is set to top-down shooting mode based on the z-axis of the mobile terminal acceleration sensor;
   automatically adjusting a camera orientation using a mobile terminal gyroscope sensor when the camera is set to top-down shooting mode; and
   automatically detecting a case in which a value extracted from the acceleration sensor and belonging to a predetermined range uses at least one of the following: a z-axis value extracted from the mobile terminal acceleration sensor, an absolute value of the z-axis value, or specific values extracted from z-axis samples observed in a predetermined time window.

2. The automatic adjustment method of claim 1, which includes:
automatically adjusting the orientation of the camera by recognizing, as a rotation event of the mobile terminal, a case in which a rotation angle obtained by integrating a rotating angular velocity of the mobile terminal gyroscope sensor is greater than or equal to a predetermined value.

3. The method of claim 2, in which the rotation angle includes both clockwise and counterclockwise rotation angles, and
wherein, when each rotation angle is greater than or equal to the predetermined value, rotations of the mobile terminal are classified based on their respective rotation angles.

4. The method of claim 1, which further involves:
adjusting the orientation of a photo by updating its metadata and using the mobile terminal gyroscope sensor.

5. The method of claim 1, in which the accuracy of rotation detection is enhanced by limiting the number of camera orientations to one of portrait and landscape-right modes.

6. A method of adjusting a camera top-down angle of a mobile terminal that involves the following:
automatically detecting whether a mobile terminal camera is set to top-down shooting mode based on the z-axis of a mobile terminal acceleration sensor; and
displaying a mobile terminal camera orientation such that a user recognizes the camera orientation and manually adjusts it when it does not correspond to the shooting orientation; and
displaying an overlay guide screen corresponding to the camera orientation on a mobile terminal viewfinder screen or using an alert such as a vibration, warning sound, or LED light so that a user recognizes the camera orientation;
wherein the overlay guide screen is activated or deactivated by means of a single step in the viewfinder screen.

7. The method of claim 6, in which the overlay guide screen includes user interfaces for manually adjusting the camera orientation.

8. The method of claim 7, in which a method of manually adjusting the camera orientation includes using a gesture and user interfaces when the camera orientation does not correspond to the shooting orientation.

9. A method of adjusting a camera top-down angle of a mobile terminal that involves the following:
automatically detecting whether a mobile terminal camera is set to top-down shooting mode based on a z-axis of a mobile terminal acceleration sensor;
automatically adjusting a camera orientation by means of a mobile terminal gyroscope sensor when the camera is set to top-down shooting mode; and
displaying a mobile terminal camera orientation such that a user recognizes the camera orientation and manually adjusts it when it does not correspond to the shooting orientation; and
automatically detecting a case in which a value extracted from the acceleration sensor and belonging to a predetermined range uses at least one of the following: a z-axis value extracted from the mobile terminal acceleration sensor, an absolute value of the z-axis value, or specific values extracted from z-axis samples observed in a predetermined time window.

10. The method of adjusting a camera top down angle of claim 9 which further comprises:
displaying an overlay guide screen corresponding to the camera orientation on a mobile terminal viewfinder screen, in which the overlay guide screen is activated or deactivated by a single step in the viewfinder screen.

11. A camera top-down angle-adjusting system of a mobile terminal that involves:
an automatic shooting-mode detection unit adapted to detect automatically whether a mobile terminal camera is set to top-down shooting mode based on the z-axis of a mobile terminal acceleration sensor;
an automatic adjustment unit adapted to adjust automatically a camera orientation by means of a mobile terminal gyroscope sensor when the camera is set to top-down shooting mode; and
a manual adjustment unit adapted to display a mobile terminal camera orientation such that a user intuitively recognizes the camera orientation and manually adjusts it when it does not correspond to the shooting orientation;
wherein the automatic shooting-mode detection unit automatically detects a case in which a value extracted from the acceleration sensor and belonging to a predetermined range uses at least one of the following: a z-axis value extracted from the mobile terminal acceleration sensor, an absolute value of the z-axis value, or specific values extracted from z-axis samples observed in a predetermined time window.

12. The camera top-down angle-adjusting system of claim 11, in which the automatic adjustment unit automatically adjusts the camera orientation by recognizing, as a rotation event of the mobile terminal, a case in which a rotation angle obtained by integrating a rotating angular velocity of the mobile terminal gyroscope sensor is greater than or equal to a predetermined value.

13. The camera top-down angle-adjusting system of claim 11, in which the manual adjustment unit displays an overlay guide screen that corresponds to the camera orientation on a mobile terminal viewfinder screen or uses an alert such as a vibration, warning sound, or LED light such that a user recognizes the orientation of the camera.

14. A method of adjusting a camera top-down angle of a mobile terminal that involves the following:
automatically detecting whether a mobile terminal camera is set to top-down shooting mode based on the z-axis of the mobile terminal acceleration sensor;
automatically adjusting a camera orientation using a mobile terminal gyroscope sensor when the camera is set to top-down shooting mode; and
adjusting the orientation of a photo by updating its metadata and using the mobile terminal gyroscope sensor.

15. The automatic adjustment method of claim 14, which includes:
automatically adjusting the orientation of the camera by recognizing, as a rotation event of the mobile terminal, a case in which a rotation angle obtained by integrating a rotating angular velocity of the mobile terminal gyroscope sensor is greater than or equal to a predetermined value.

16. The method of claim 15, in which the rotation angle includes both clockwise and counterclockwise rotation angles, and wherein, when each rotation angle is greater than or equal to the predetermined value, rotations of the mobile terminal are classified based on their respective rotation angles.

17. The method of claim 14, in which the accuracy of rotation detection is enhanced by limiting the number of camera orientations to one of portrait and landscape-right modes.

18. A method of adjusting a camera top-down angle of a mobile terminal that involves the following:
   automatically detecting whether a mobile terminal camera is set to top-down shooting mode based on the z-axis of the mobile terminal acceleration sensor and
   automatically adjusting a camera orientation using a mobile terminal gyroscope sensor when the camera is set to top-down shooting mode;
   wherein the accuracy of rotation detection is enhanced by limiting the number of camera orientations to portrait and landscape-right modes.

19. The automatic adjustment method of claim 18, which includes:
   automatically adjusting the orientation of the camera by recognizing, as a rotation event of the mobile terminal, a case in which a rotation angle obtained by integrating a rotating angular velocity of the mobile terminal gyroscope sensor is greater than or equal to a predetermined value.

20. The method of claim 19, in which the rotation angle includes both clockwise and counterclockwise rotation angles, and
   wherein, when each rotation angle is greater than or equal to the predetermined value, rotations of the mobile terminal are classified based on their respective rotation angles.

21. A method of adjusting a camera top-down angle of a mobile terminal that involves the following:
   automatically detecting whether a mobile terminal camera is set to top-down shooting mode based on the z-axis of a mobile terminal acceleration sensor; and
   displaying a mobile terminal camera orientation such that a user recognizes the camera orientation and manually adjusts it when it does not correspond to the shooting orientation; and
   displaying an overlay guide screen corresponding to the camera orientation on a mobile terminal viewfinder screen or using an alert such as a vibration, warning sound, or LED light so that a user recognizes the camera orientation;
   wherein the overlay guide screen includes user interfaces for manually adjusting the camera orientation which includes using a gesture and user interfaces when the camera orientation does not correspond to the shooting orientation.

22. A camera top-down angle-adjusting system of a mobile terminal that involves:
   an automatic shooting-mode detection unit adapted to detect automatically whether a mobile terminal camera is set to top-down shooting mode based on the z-axis of a mobile terminal acceleration sensor;
   an automatic adjustment unit adapted to adjust automatically a camera orientation by means of a mobile terminal gyroscope sensor when the camera is set to top-down shooting mode; and
   a manual adjustment unit adapted to display a mobile terminal camera orientation such that a user intuitively recognizes the camera orientation and manually adjusts it when it does not correspond to the shooting orientation;
   wherein the manual adjustment unit displays an overlay guide screen that corresponds to the camera orientation on a mobile terminal viewfinder screen or uses an alert such as a vibration, warning sound, or LED light such that a user recognizes the orientation of the camera.

23. The camera top-down angle-adjusting system of claim 22, in which the automatic adjustment unit automatically adjusts the camera orientation by recognizing, as a rotation event of the mobile terminal, a case in which a rotation angle obtained by integrating a rotating angular velocity of the mobile terminal gyroscope sensor is greater than or equal to a predetermined value.

* * * * *